Figure 1:
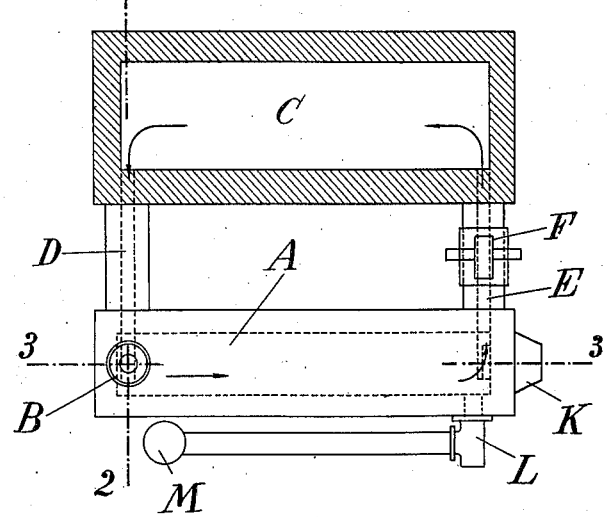

No. 894,383. PATENTED JULY 28, 1908.
A. H. IMBERT.
TREATMENT OF ORES BY MEANS OF THE PRECIPITATION PROCESS.
APPLICATION FILED AUG. 19, 1907.

UNITED STATES PATENT OFFICE.

ANTOINE HENRI IMBERT, OF GRAND-MONTROUGE, FRANCE, ASSIGNOR TO IMBERT PROCESS COMPANY, OF NEW YORK, N. Y., A CORPORATION OF NEW YORK.

TREATMENT OF ORES BY MEANS OF THE PRECIPITATION PROCESS.

No. 894,383.     Specification of Letters Patent.     Patented July 28, 1908.

Application filed August 19, 1907. Serial No. 389,280.

*To all whom it may concern:*

Be it known that I, ANTOINE HENRI IMBERT, engineer, of 75 Avenue de la République, Grand-Montrouge, Department of the Seine, France, a citizen of the French Republic, have invented a new and useful Improved Treatment of Ores by Means of the Precipitation Process.

The precipitation process that is to say, the decomposition, at a high temperature, of metallic sulfids by a reacting metal, in order to obtain the precipitation of the metal of the sulfid with the formation of sulfid of the re-. agent, was, at first, proposed for treating sulfid of lead, then sulfids of antimony, bismuth, silver, etc., at the temperature of fusion, with iron as a reagent. Later, it was proposed to treat blende (sulfid of zinc) by this method, always with iron as the reagent, and condensing the zinc vapors thereby produced. Afterwards it was proposed to substitute for iron other metals as reagents (manganese, etc.), and especially copper, recuperating the metallic copper by bessemerizing the matte produced. It has also been proposed, in order to facilitate the reaction of the iron and to render it more rapid, more complete and realizable at a relatively low temperature, to employ dissolving baths, capable of easily liquefying the ore or initial sulfid as also the residual sulfid; which is particularly advantageous when treating blendes in that, the work has to be done in a closed vessel to prevent the zinc vapors from burning. Lastly, it has been proposed to treat more or less oxidized zinc ores by using the dissolving baths. In each and all of the above forms of execution of the precipitation process, the working has been effected by intermittent, successive charges of the reacting metal and of the ore with, or without, the addition of dissolvents.

The present invention is applicable to the particular methods above mentioned.

The invention consists substantially, in bringing into the reacting chamber a current of reacting metal melted and superheated; that is to say, heated to a temperature above that of fusion, said current flowing in said chamber at a given speed, from the time of its entrance to its exit or the flow may be intermittent and in applying to the surface of said metal, either continuously or intermittently, the ore which is desired to be treated, with, or without, the addition of the dissolvent. Due to its superheating, the melted metal will give off, or transmit, enough of its heat to the charge of ore to melt or fuse the said ore, producing the desired reaction, while also itself remaining liquid. The ore as it is brought into contact with the melted metal is carried on by the movement of the latter so that, if the reacting chamber be long enough, or *per contra* if the velocity of flow be slow enough, the ore will be completely exhausted when it reaches the egress end of the chamber. On the other hand, in consequence of the advancement of the current of reacting metal and of the consequent carrying onward of the charge, the locality where the ore is preferably applied to the reagent is always free, or "clean", that is the ore will necessarily impinge upon the active surface of the superheated reacting metal. The excess of the reacting metal; the residue of the reaction; the gangue; the slag and the metal produced sort themselves by density and can easily be separated; or when the metal produced is in a state of vapor, it merely requires to be condensed.

The amount of liquid reacting metal, superheated, to be introduced into the reacting chamber in a given time, depends upon the number of thermal units required to melt the ore and its additions, to produce the reaction, (*i. e.*, should it not be exothermic), and also to make up for losses, such as radiation, in addition to which the excess of reagent metal, and the residues, shall not be permitted to solidify. Therefore, the amount of reacting metal depends particularly on the calorific capacity of the reacting metal itself and the temperature to which the superheating is carried. In this connection, it should be observed that the heat necessary for the operation is brought directly into the reacting chamber; and, as this heat is stored-up in the reacting metal, it is brought to the ore in the most intimate manner possible, and far more effectively than by conduction of heat through furnace walls, from without to within.

It will be clear that the superheating of the reacting metal can be effected in divers manners; as, for instance, by direct action of a combustible on the metal in a suitable furnace or by the action of an electric current under appropriate conditions. The flow of the reacting metal through the reacting chamber may be established and maintained by any suitable means to produce a difference in the level of the metal at the entrance and the exit. The excess of reacting metal, discharged from the reacting chamber in a fluid state, may be returned by any suitable means, or kind of circulating device, to the superheater; thus repassing indefinitely through the reacting chamber. In each case, any convenient means may be employed to separate the excess of the reagent from the residues and the metal produced.

To fix the foregoing exposition, the invention will now be described in its application to the treatment of zinc ores, as perhaps presenting the most interesting conditions. It should, however, be well understood that the said illustration is only given as an example and should not be interpreted as in any way limiting the scope of the invention.

The annexed drawing represents, diagrammatically, an installation for carrying out the new process.

Figure 2:
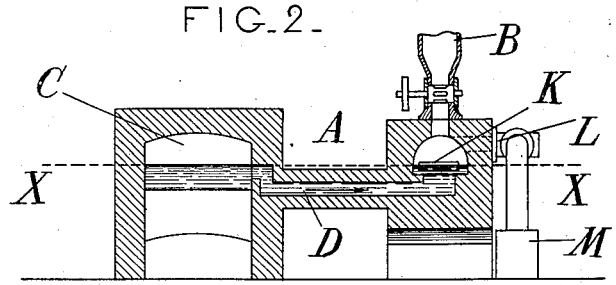
Figure 3:
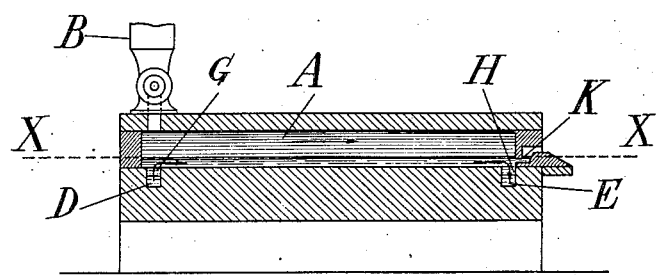

Figure 1 is a plan view in section. Fig. 2 is a transversal section on line 2—2 of Fig. 1; and Fig. 3 is a longitudinal section on line 3—3 of Fig. 1.

Suppose the case of treating blende, more or less concentrated, by iron, with the use of a dissolvent to facilitate the reaction

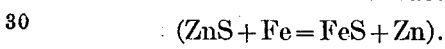
$$(ZnS + Fe = FeS + Zn).$$

The blende, having been sufficiently crushed, is mixed with the dissolvent, likewise crushed; preferably this dissolvent will consist of peroxid of iron, $Fe_2O_3$, and of slaked lime $Ca(HO)_2$, in the proportions, by weight, of, say, 100 of blende, 23 of peroxid and 10 of lime. The mixture of blende and dissolvent is fed into a reacting chamber A in a continuous or intermittent stream by the charging hopper B. The iron, preferably such as is ordinarily designated cast iron, is melted and superheated in a furnace C, as for instance of the Siemens-Martin type. The furnace C communicates with the reacting chamber A by means of two ducts D and E. Consequently the level X—X Fig. 2 of the liquid cast iron is the same in A and in C. A propelling apparatus F, such as a pump or a paddle wheel, of graphite or other suitable refractory material, establishes a continuous circulation of the current of cast iron from the furnace C to the reacting chamber by the duct D; thence the current of iron, after having traversed the entire length of the reacting chamber A, returns to the superheater C by the duct E, as shown by the arrows.

Assume the apparatus at work: A current of liquid iron, superheated, enters the reacting chamber at G and spreads out in a comparatively thin layer in said chamber. A stream of ore, distributed by the hopper B falls on the surface of said layer of iron. The blende and the dissolvent become heated and melt, that is fused, smelted, and the zinc goes off in vapors. The layer of metal and the entrained layer of the melted charge proceed together towards the exit H of the chamber; which is sufficiently far from the charging point to allow the zinc in the ore to be completely exhausted. The feed of iron and of ore should be regulated so as to best utilize the calories stored in the superheated iron and the fall of the temperature of the iron should not be permitted to go so far as to risk its solidification. During the traverse of the chamber, the layer of iron becomes covered with a coating of sulfid of iron, a product of the reaction, and of slag. These residues may be preferably run off automatically from the reacting chamber by a trapped exit K while the excess of iron, that is the iron not used in the reaction, returns to the superheater by the duct E to be used over again. The reacting chamber is hermetically closed and is fitted with an exhaust L for the gases and zinc vapors produced; the latter being liquefied in the condenser M. Fresh cast iron is added to the current preferably in the furnace, in sufficient quantity to compensate for that absorbed by the reaction. By flowing air on or into the liquid sulfid of iron withdrawn from the reacting chamber, it can be transformed into oxid; which in turn can be treated with carbon to recuperate the metallic iron; and this, in its turn, is then run back into the superheater. Generally, the losses of iron due to its recuperation, etc., will be compensated, or even added to, by the iron contained in the ore.

The preliminary superheating of the cast iron can be done by electricity, which is regarded as an advantageous means when current can be cheaply produced.

The process does not vary in its essence when the iron is replaced by copper or another reacting metal. If the reaction takes place quickly enough, completely enough and at a sufficiently low temperature with ore alone, it is obviously superfluous to add a dissolvent.

If, instead of blende, an oxid of zinc ore, or silicates for instance, are to be treated the process remains essentially the same; but in such case sulfid of iron and slaked lime should be used as dissolvent, say in the proportion of 100 of ore; 50 of sulfid of iron and 10 of lime.

In the case of complex zinc and lead sulfid ores, the treatment will likewise be practically similar, except that the residual sulfid of iron will contain the lead; and, when present, also, the silver and other precious metals. The lead, etc., may then be precipitated, by treating the residual galeniferous matte with metallic iron, slaked lime and peroxid of iron; and thereafter the iron may be recuperated from the so treated iron matte.

As compared to previous processes, the invention presents considerable advantages, among which may be cited in the first instance: the continuity of the process; the internal heating by the storage of heat in a current of liquid metal; the avoidance of retorts; the great capacity of the apparatus; the regularity and uniformity of production; the simplicity of the installation; the reduction of labor to a minimum; the almost complete utilization of the heat; the practically total exhaustion of the ore; the small cost of erection and maintenance of plant; the heating, at will, according to circumstances, by Joule effect or by direct superheating; and the possibility of the application of the method to the treatment of all ores capable of being worked by the precipitation process, whatever be their nature, whatever be the reacting metal, with or without auxiliary dissolvents, whether the metal produced be liquid or gaseous at the temperature of reaction.

Claims:

1. The smelting of ores by the precipitation process, which consists in causing superheated liquid metal, to flow through a reaction chamber the said metal being of a character capable of replacing the metal of the ore which it is desired to extract, applying the ore, with whatever dissolvents and fluxes are necessary, to the surface of said liquid metal, at its up-stream portion, allowing the liquid metal and the ore to flow along together until the whole mass becomes fluid and the reaction is complete, and in then causing the products and the residues to discharge from the reaction chamber in distinct currents through separate egresses.

2. The smelting of ores by the precipitation process, which consists in introducing liquid metal, into a reaction chamber, to flow therethrough the said metal being of a character capable of replacing the metal of the ore which it is desired to extract, applying the prepared ore to the metal so as to flow on therewith, said metal being in sufficient volume and adequately superheated to effect the desired reaction, during the time required to traverse the chamber, without itself becoming "pasty" or solidified, whereby the various products of the reaction may be separately ejected and the excess of the reaction-metal may be conducted to a separate reservoir, or retort, to be re-heated and used over again.

3. The smelting of ores by the precipitation process, consisting in introducing into a reacting chamber a continuous current of liquid superheated metal of a character capable of replacing the metal of the ore which it is desired to extract and a stream of crushed ore along with the necessary fluxes and dissolvents causing the current of metal and the stream of ore to meet in the neighborhood of their entrance into the chamber, allowing them to flow along together in contact until the whole becomes fluid and the reaction be completed, allowing the products and residues to classify themselves by the difference of their densities, and causing them to escape from the reacting chamber in separate currents through different orifices.

4. The smelting of ores by the precipitation process, consisting in introducing into a reacting chamber a continuous current of liquid metal of a character capable of replacing the metal of the ore which it is desired to extract, in sufficient quantity and previously superheated so as to contain enough calories to melt the ore and its dissolvents and fluxes, to produce the reaction and to maintain the excess of reacting metal, the products obtained and the residues in a fluid state, spreading the current of metal in a thin layer in the chamber, introducing a charge of crushed ore and its dissolvents and fluxes into the chamber in the form of a small stream falling on the layer of metal in the neighborhood of its entrance and spreading it out on said layer as a thin coating, allowing the two layers in contact to flow along together until the whole becomes fluid and until the reaction be completed, allowing the products and residues to classify themselves by the difference of their densities, causing the excess of reacting metal, the metal obtained and the residues to escape from the chamber in three separate currents by different orifices, reheating to the required temperature the excess of reacting metal and adding thereto a sufficient quantity of fresh metal to compensate for that absorbed by the reaction, and putting such metal again into circulation through the chamber.

5. The smelting of zinc ores by the precipitation process, consisting in introducing into a hermetically closed chamber a continuous current of liquid superheated metal of a character capable of replacing the metal of the ore which it is desired to extract, introducing a charge of crushed ore and dissolvents in the form of a stream, causing the two streams to meet and allowing them to flow along in contact until the zinc be exhausted, collecting separately the zinc vapors and gaseous products, in condensing the zinc, causing the excess of metal to escape separately and in causing it to return to the superheater and then to the reacting chamber, causing the residue of the reaction with the gangues to escape by a trapped orifice, and recuperating the reacting metal contained in such residues and returning it to the superheater.

6. The smelting of blendes by the precipitation process, consisting in introducing into a closed reacting chamber a continuous current of liquid superheated iron, introducing into said chamber crushed blende, mixed with peroxid of iron and slaked lime as dissolvent, causing the two streams to meet and allowing them to flow along in contact until the zinc be exhausted, collecting separately the zinc vapors and gaseous products, in condensing the zinc, causing the excess of liquid reacting metal to escape separately and returning it to the superheater, causing the sulfid of iron with the gangues to escape by a trapped orifice, subjecting said sulfid to an air blast to transform it into oxid, recuperating the metallic iron by means of said oxid and returning the iron so produced to the superheater and from thence to the reacting chamber.

7. The smelting of galeniferous blendes by the precipitation process, consisting in introducing into a closed chamber a current of superheated cast iron, introducing into said chamber the crushed galeniferous blende, mixed with a dissolvent, causing the two streams to meet and to flow along together in contact until the zinc is exhausted, condensing the zinc vapors, putting the excess of cast iron again into circulation through the superheater and the chamber, causing the galeniferous sulfid of iron with the gangues to escape by a trapped orifice, treating said sulfid by precipitation by means of iron, lime and peroxid of iron in order to extract the lead and precious metals, transforming the remaining sulfid of iron into oxid by an air blast, and recuperating the iron in said oxid and reëmploying it.

In testimony whereof I affix my signature in presence of two witnesses.

ANTOINE HENRI IMBERT.

Witnesses:
 CLAUDIUS LUSSON,
 PAUL ROBIN.